(12) United States Patent
Kakani et al.

(10) Patent No.: US 8,223,647 B2
(45) Date of Patent: Jul. 17, 2012

(54) SYSTEM AND METHOD FOR INCREASING DATA THROUGHOUT USING A BLOCK ACKNOWLEDGEMENT

(75) Inventors: Naveen Kakani, Irving, TX (US); Yousuf Saifullah, Flower Mound, TX (US)

(73) Assignee: Nokia Corporation (FI)

( * ) Notice: Subject to any disclaimer, the term of this patent is extended or adjusted under 35 U.S.C. 154(b) by 915 days.

(21) Appl. No.: 10/895,657

(22) Filed: Jul. 21, 2004

(65) Prior Publication Data
US 2006/0018332 A1    Jan. 26, 2006

(51) Int. Cl.
H04L 12/26    (2006.01)
H04L 1/18    (2006.01)
H04J 3/26    (2006.01)

(52) U.S. Cl. ........ 370/236; 370/473; 370/394; 370/428; 370/338; 714/748

(58) Field of Classification Search .......... 370/236, 370/394, 428, 468, 338, 474, 236.473; 714/748–749
See application file for complete search history.

(56) References Cited

U.S. PATENT DOCUMENTS

| | | | | |
|---|---|---|---|---|
| 5,727,002 A * | 3/1998 | Miller et al. | .............. | 714/748 |
| 5,948,060 A * | 9/1999 | Gregg et al. | .............. | 709/212 |
| 6,301,249 B1 * | 10/2001 | Mansfield et al. | .......... | 370/394 |
| 6,367,045 B1 * | 4/2002 | Khan et al. | .............. | 714/748 |
| 6,367,056 B1 | 4/2002 | Lee | | |
| 6,557,135 B1 * | 4/2003 | Balachandran et al. | ...... | 714/748 |
| 6,574,668 B1 * | 6/2003 | Gubbi et al. | ............ | 709/237 |
| 6,574,688 B1 * | 6/2003 | Dale et al. | .............. | 710/52 |
| 6,694,471 B1 * | 2/2004 | Sharp | ............... | 714/749 |
| 6,772,215 B1 | 8/2004 | Rathonyi et al. | | |
| 6,778,501 B1 * | 8/2004 | Malmgren et al. | .......... | 370/236 |
| 7,031,336 B2 * | 4/2006 | Scherzer et al. | .......... | 370/338 |
| 7,089,476 B2 * | 8/2006 | Cayla | ............. | 714/748 |
| 7,221,684 B1 * | 5/2007 | Smith et al. | .......... | 370/477 |
| 7,224,704 B2 * | 5/2007 | Lu et al. | .......... | 370/476 |
| 7,304,995 B2 * | 12/2007 | Lu et al. | .......... | 370/394 |
| 7,385,976 B2 * | 6/2008 | Gu et al. | .......... | 370/389 |
| 7,428,240 B2 * | 9/2008 | Jang et al. | .......... | 370/447 |
| 7,630,403 B2 * | 12/2009 | Ho et al. | .......... | 370/473 |
| 7,664,140 B2 * | 2/2010 | Rajkotia et al. | ......... | 370/473 |
| 2002/0150064 A1 * | 10/2002 | Lucidarme | .......... | 370/333 |
| 2003/0018524 A1 | 1/2003 | Fishman et al. | | |

(Continued)

FOREIGN PATENT DOCUMENTS
CN    1343410    4/2002
(Continued)

OTHER PUBLICATIONS
Making QoS a reality over WLAN, Tim Godfrey. 4 pages.
(Continued)

*Primary Examiner* — Steven H Nguyen
*Assistant Examiner* — Candal Elpenord
(74) *Attorney, Agent, or Firm* — Banner & Witcoff, Ltd.

(57) ABSTRACT

Systems and methods are provided to increase data throughput by aggregating block acknowledgements. Embodiments of these systems and methods provide a single block acknowledgement for multiple traffic identifiers in data communication with a communication station. One method includes providing a multiple start sequence number corresponding to each traffic identifier of a plurality of traffic identifiers and providing a bit map corresponding to each multiple start sequence number. The bit map indicates a block acknowledgement of packets corresponding to one traffic identifier of the plurality of traffic identifiers.

19 Claims, 4 Drawing Sheets

U.S. PATENT DOCUMENTS

| | | | |
|---|---|---|---|
| 2003/0043744 A1* | 3/2003 | Lu et al. | 370/236 |
| 2003/0086391 A1* | 5/2003 | Terry et al. | 370/329 |
| 2003/0115337 A1* | 6/2003 | Jayam et al. | 709/228 |
| 2003/0135640 A1* | 7/2003 | Ho et al. | 709/237 |
| 2003/0169769 A1* | 9/2003 | Ho et al. | 370/473 |
| 2003/0179752 A1* | 9/2003 | Grass | 370/394 |
| 2003/0214930 A1* | 11/2003 | Fischer | 370/338 |
| 2004/0143676 A1* | 7/2004 | Baudry et al. | 709/237 |
| 2005/0015703 A1* | 1/2005 | Terry et al. | 714/776 |
| 2005/0063340 A1* | 3/2005 | Hoffmann et al. | 370/332 |
| 2005/0195776 A1* | 9/2005 | Xu | 370/338 |
| 2005/0204247 A1* | 9/2005 | Guo et al. | 714/746 |
| 2005/0226273 A1* | 10/2005 | Qian | 370/474 |

FOREIGN PATENT DOCUMENTS

| | | |
|---|---|---|
| EP | 1571773 | 9/2005 |
| JP | 2005-252897 | 9/2005 |
| WO | WO 00/33502 | 6/2000 |
| WO | WO 00/60797 | 10/2000 |
| WO | WO 03/061182 | 7/2003 |

OTHER PUBLICATIONS

English Translation of Office action for Japanese Application No. 2007-522051 dated Sep. 21, 2010.

English Translation of Office action for corresponding Chinese Application No. 200580024338.X dated Dec. 24, 2010.

Office Action for Chinese Patent Application No. 200580024338.X, dated Apr. 19, 2011.

English translation for Office Action for Chinese Patent Application No. 200580024338.X, dated Apr. 19, 2011.

* cited by examiner

SYSTEM AND METHOD FOR INCREASING DATA THROUGHOUT USING A BLOCK ACKNOWLEDGEMENT

BACKGROUND OF THE INVENTION

1. Field of the Invention

The present invention relates generally to wireless local area network (WLAN) technology. More particularly, the present invention relates to a increasing data throughput using a block acknowledgement.

2. Description of the Related Art

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

Recently, there has been a great increase in the use of wireless local area networks (WLANs) conforming to the IEEE 802.11 communication standard. WLANs are expected to support the same applications as wired networks that they replace or supplement. The IEEE 802.11e group is developing media access control (MAC) improvements to support quality of service (QoS) sensitive applications, to enable a better mobile user experience, and to make more efficient use of the wireless channel.

FIG. 1 illustrates a prior art communication frame 2 for non-quality of service (QoS) acknowledgements. The communication frame 2 includes a frame control field 3, a duration/ID field 4, a Receiver Address (RA) field 5, and a FCS (frame check sequence) field 6.

The 802.11e specification includes a variety of optional features. One of the optional features is known as block acknowledgements (Block ACK). The legacy 802.11 MAC always sends an ACK frame after each frame that is successfully received. Block ACK allows several data frames to be transmitted before an ACK is returned, which increases the efficiency since every ACK frame has a significant overhead for transmission. Block ACK is initiated through a setup and negotiation process between the Quality of Service station (QSTA) and Quality of Service Access Point (QAP). Once the block ACK has been established, multiple quality of service (QoS) data frames can be transmitted in a contention free burst, with short inter-frame space (SIFS) separation between the frames.

Currently, there are two block ACK mechanisms defined under 802.11e: immediate and delayed. When using immediate block ACK, the sending station transmits multiple data frames in a contention free burst, separated by SIFS. The sender must obey the constraints of the transmit opportunities (TXOP) duration it is currently operating within. At the end of the burst, the sender transmits a block ACK request frame. The receiver must immediately respond with a block ACK frame containing the acknowledgement status for the previous burst of data frames.

The delayed policy allows the group acknowledgement to be sent in a subsequent TXOP following the burst. The same sequence of a contention free burst and block ACK request is used as in the immediate mode. The receiver simply sends a standard ACK in response to the block ACK request, indicating that the block ACK will be delayed. Delayed acknowledgement increases the latency, and is provided to support lower performance implementations that are unable to immediately calculate the ACK.

FIG. 2 illustrates a prior art communication frame for quality of service (QoS) data block acknowledgement. This block acknowledgement is defined in the IEEE 802.11e specification. The block acknowledgement (ACK) structure acknowledges frames within on traffic identifier (TID). The Block ACK acknowledges a block of frames with one signaling message. Nevertheless, the Block ACK is applicable to only one communication traffic stream, identified by a traffic identifier (TID). A traffic stream is a stream of data (e.g., voice and best effort data) associated with a certain traffic specification. The starting sequence control provides a sequence number of the frames starting from the receiver which need to send a block acknowledgement. Every subsequent frame is indicated as a bit in the bitmap. A zero (0) in the bitmap indicates no received and a one (1) in the bitmap means received.

Thus, there is a need to enhance the Block ACK function by aggregating block ACK for different TIDs for a communication station so that it can be applicable to multiple traffic streams. In this way, a communication station with multiple applications can use just one Block ACK instead of requiring a Block ACK for each traffic identifier (TID). Further, there is a need to aggregate multiple frames from different traffic identifiers (TID) to enable the sending of an aggregated block ACK per communication station for multiple TIDs.

SUMMARY OF THE INVENTION

One exemplary embodiment relates to a method of providing a single block acknowledgement for multiple traffic identifiers in data communication with a communication station. The method includes providing a multiple start sequence number corresponding to each traffic identifier of a plurality of traffic identifiers and providing a bit map corresponding to each multiple start sequence number. The bit map indicates a block acknowledgement of packets corresponding to one traffic identifier of the plurality of traffic identifiers.

As a result of the exemplary embodiments, a station responds with one ACK when it receives multiple frames aggregated together, instead of multiple ACKs. The exemplary embodiments are applicable to both immediate and delayed ACK cases. It is possible to do aggregation of regular ACK, delayed Block ACKs, and immediate Block ACKs in any combination.

Another exemplary embodiment relates to a system for providing a single block acknowledgement for multiple traffic identifiers in data communication with a communication station. The system includes a transmit opportunity including quality of service data and short inter-frame spaces and a block acknowledgement structure including a multiple start sequence number for each of a plurality of traffic identifiers and a corresponding bit map indicating acknowledgement of packets corresponding to one traffic identifier of the plurality of traffic identifiers.

Another exemplary embodiment relates to a device configured for communication in a wireless local area network (WLAN) with a data throughput including aggregated block acknowledgements. The device includes a memory configured to contain a block acknowledgement structure and a processor that communicates the block acknowledgement structure to indicate receipt of data. The block acknowledgement structure includes a multiple start sequence number for each of a plurality of traffic identifiers and a corresponding bit map indicating acknowledgement of packets corresponding to one traffic identifier of the plurality of traffic identifiers.

Another exemplary embodiment relates to a computer program product that increases data throughput by aggregating block acknowledgements to a single block acknowledgement for a plurality of traffic identifiers in a communication system. The computer program product includes computer code to assign a start sequence number for each of a plurality of traffic identifiers, wherein each start sequence number is associated with a bit map indicating acknowledgment status for the corresponding traffic identifier; and computer code to provide a block acknowledgment control field for each of the plurality of traffic identifiers.

Yet another exemplary embodiment relates to a block acknowledgment structure including a multiple start sequence number for each of a plurality of traffic identifiers and a corresponding bitmap indicating acknowledgement of packets corresponding to one traffic identifier of the plurality of traffic identifiers.

DETAILED DESCRIPTION OF EXEMPLARY EMBODIMENTS

Figure 3:
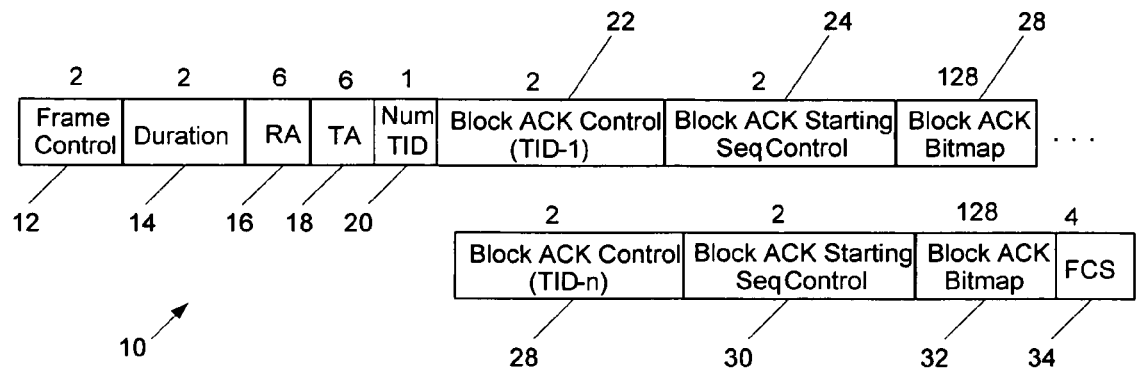
FIG. 3 is a diagram depicting a communication frame including a block acknowledgement feature in accordance with an exemplary embodiment.

FIG. 3 illustrates a communication frame 10 including a block acknowledgment feature for a communication station (STA). The block acknowledgement acknowledges frames for all traffic identifiers (TIDs) currently served through a communication station (STA). The communication frame 10 is made up of a number of data communication fields. According to an exemplary embodiment, the communication frame 10 includes a frame control field 12, a duration field 14, a RA (Receiver Address) field 16, and a TA (Transmitter Address) field 18.

For TID number 1, there is a block ACK control field 22, a block ACK starting sequence control field 24, and a block ACK bitmap field 26. Fields for additional TIDs can be included. For illustration purposes, TID-n represents the highest numbered TID. TID-n can be represented by block ACK control field 28, block ACK starting sequence control field 30, and block ACK bitmap field 32. The communication frame 10 can include FCS (frame check sequence) field 34.

Where a number of TIDs exist, there are more than one block ACK control fields, block ACK starting sequence control fields, and block ACK bitmap fields included in the structure. In an alternative embodiment, a number TID field 20 can be included that stores a value for the number of TIDs. The duration field 14 can indicate the length of the communication frame 10.

The multiple starting sequence fields (one for each TID) and a corresponding bit map indicating the ACK/block ACK of packets corresponding to the TID allows for aggregation of block ACK for different TIDs. As a result, a station with multiple applications can use one block ACK instead of requiring a block ACK for each access category. The block ACK control field 22 carries the traffic identifier (TID). The block ACK starting sequence control field 24 has two parts, sequence number and the fragment number. The block ACK bitmap field 26 indicates the receiving status of the frames where a value of one (1) means the frame is received successfully and a value of zero (0) means the frame is not received successfully. The position in bitmap is added to the starting sequence control to determine location in communication frame.

Figure 4:
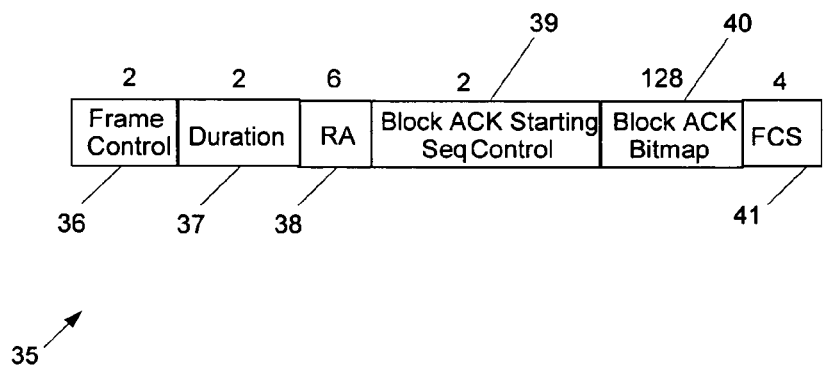
FIG. 4 is a diagram depicting a communication frame including an aggregated block acknowledgement feature for non-QoS data in accordance with an exemplary embodiment.

FIG. 4 illustrates a communication frame 35 including a block acknowledgment feature. The communication frame 35 includes non QoS data. The communication frame 35 is made up of a number of data communication fields, such as a frame control field 36, a duration field 37, a RA (Receiver Address) field 38, a block ACK starting sequence control field 39, a block ACK bitmap field 40, and a FCS (frame check sequence) field 41.

The communication frame 35 illustrates that the exemplary embodiments extend non-QoS STA or non-QoS AP. In the non-QoS case, the aggregated block ACK carries only one instance of sequence number and the sequence bitmap. There is no need for carrying a traffic identifier (TID) or a number of TID.

Sending of one ACK for a set of frames creates a single point of failure. In other words, if this one ACK is lost, the sender needs to retransmit all the outstanding frames waiting for ACK. Advantageously, according to an exemplary embodiment, the aggregated block ACK is communicated with a more robust coding over the air, increasing the chance of successful transmission of the aggregated block ACK. One option for the station is to send the aggregated block ACK with more robust coding than the current ability of the station. Another option is to send the aggregated block ACK with the best coding ability.

Accordingly to an exemplary embodiment, the aggregated Block ACK has an identification for the receiver. It can have different sub types (i.e. class to identify communication frame) in the control frame so the receiver can recognize it. It can be default feature with another feature, e.g. High Throughput Frame Aggregation capability. As a result, the presence of frame aggregation implies presence of aggregated block ACK. It can also be an optional feature negotiated between transmitter and receiver.

Figure 1:
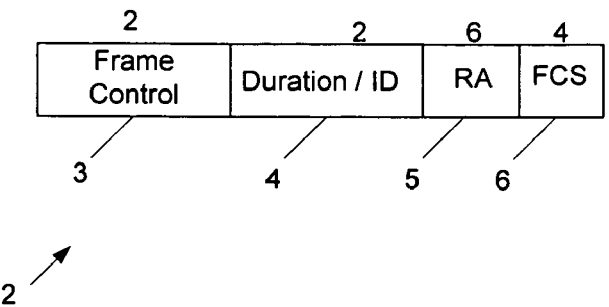
FIG. 1 is a diagram depicting a communication frame for non-quality of service (QoS) data acknowledgement.
Figure 2:
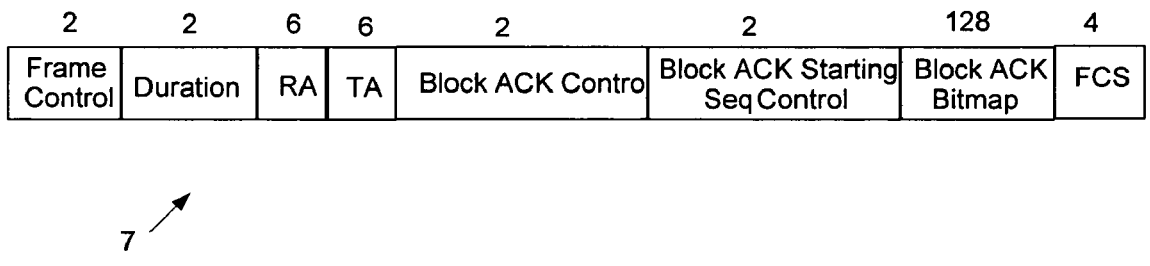
FIG. 2 is a diagram depicting a communication frame including a block acknowledgement feature.
Figure 5:
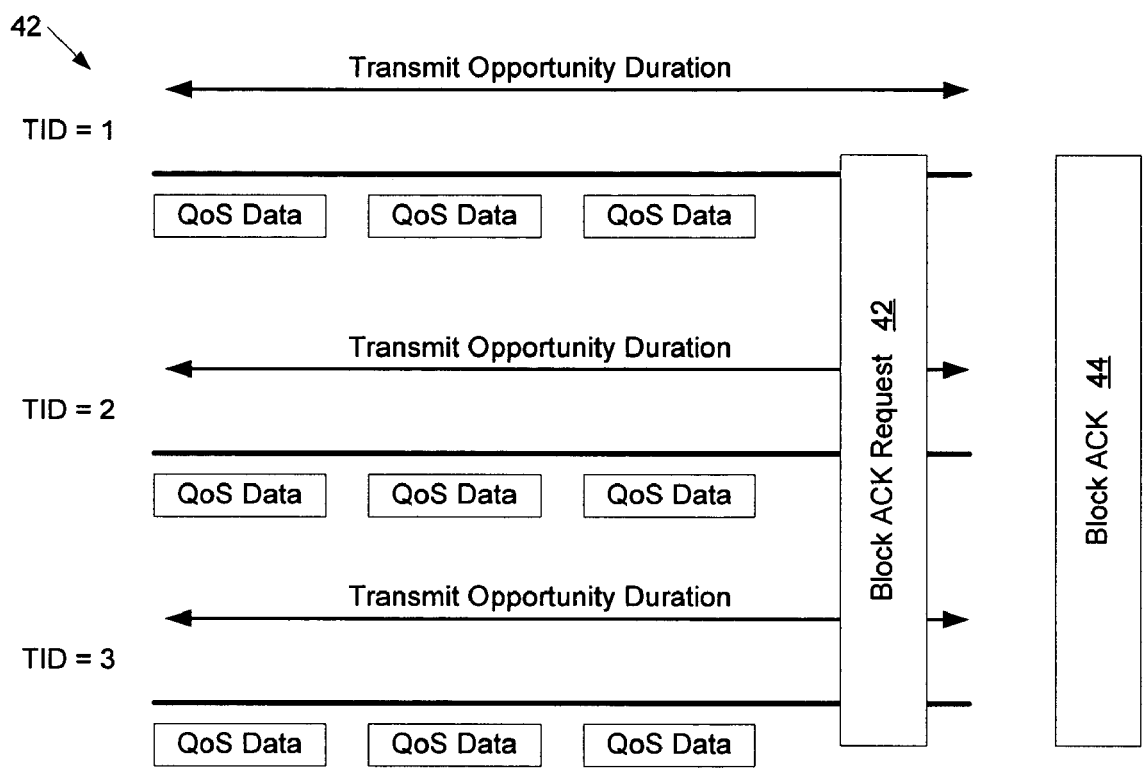
FIG. 5 is a diagram depicting an exemplary communication session involving the block acknowledgement feature of FIG. 3.

FIG. 5 illustrates an exemplary communication session involving the block acknowledgement feature described with reference to FIG. 1. In the communication session 40, three traffic identifiers are used TID=1, TID=2, and TID=3. The traffic identifiers correspond to transmit opportunities with quality of service data communicated during the opportunities. As would be understood by a person of skill in the art, Quality of Service (QoS) refers to the capability of a network to provide better service to selected network traffic over various technologies.

A common block acknowledgement request 42 is utilized by the communication streams of multiple traffic identifiers. The common block acknowledgement request 42 results in a single block acknowledgement 44 in return. As example of a block acknowledgement is described with reference to FIG. 3. As a result, data throughput in the communication network is improved. Instead of three acknowledgement requests and three acknowledgements, one acknowledgement request and one acknowledgement are communicated.

A wireless local area network (WLAN) system offers a range of data rates, such as 6, 9, 12, 18, 24, 36, 48, and 54 Mbps in 802.11a systems. A data rate is set for a station (STA) based on its current modulation and coding scheme (MCS), which in turn is governed by the STA's radio environment. A lower data rate offers better error protection than a higher data rate. For example, chances of a successful frame transmission with 18 Mbps is greater than frame transmission with 24 Mpbs. However, at the same time a STA uses maximum possible data rate based on its current radio conditions. The sending of one aggregated block ACK for a set of frames creates a single point of failure. In other words, if this one ACK is lost, the sender needs to retransmit all the outstanding frames waiting for ACK. As a result, in an exemplary embodiment, the aggregated block ACK is communicated at a lower data rate (or higher error protection), thereby increasing the chance of successful transmission. One optional implementation is for the STA to send the aggregated block ACK with one rate level lower then the current ability of the STA. For example, if the STA is capable of 18 Mbps, then it sends aggregated block ACK with 12 Mbps. Another option is to send the aggregated block ACK with the lowest data rate, i.e. 6 Mbps.

Figure 6:
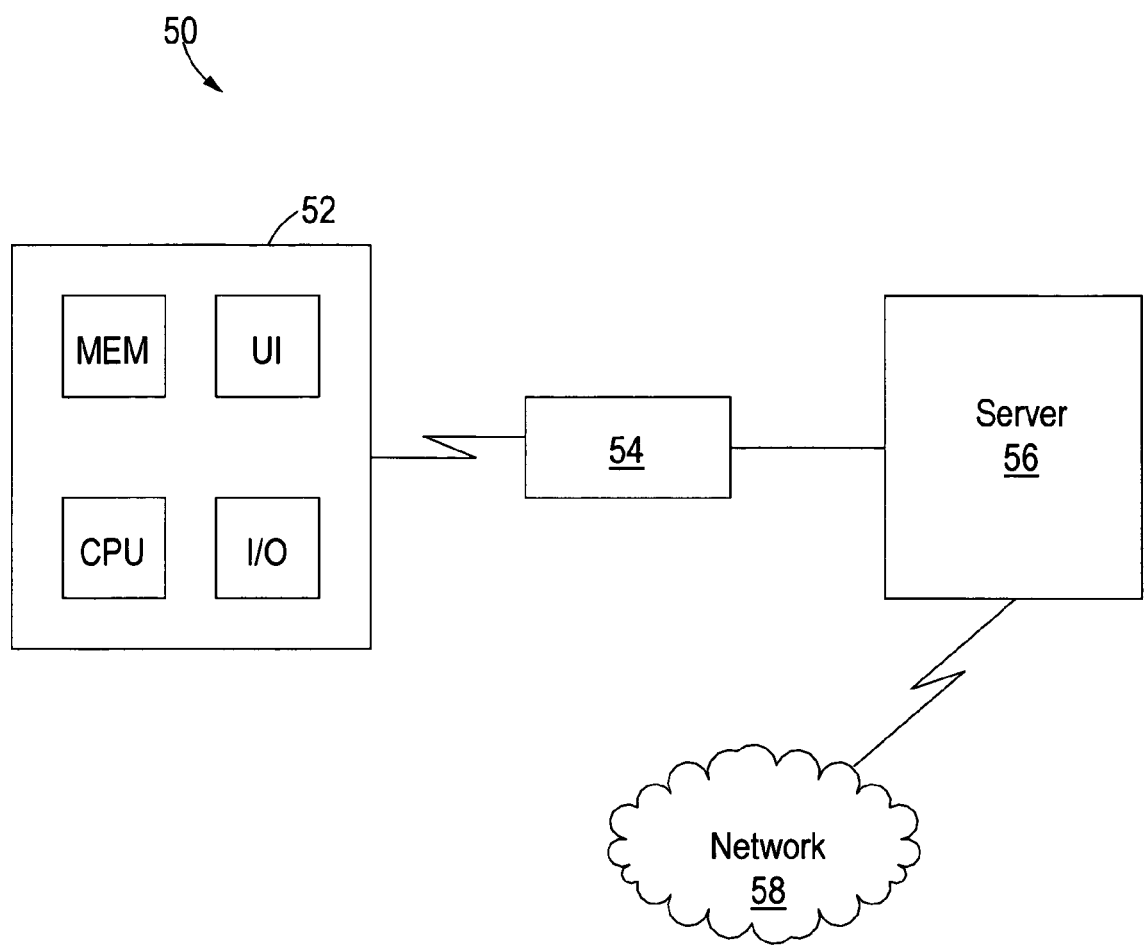
FIG. 6 is a diagram depicting a communication system including the block acknowledgement feature of FIG. 3.

FIG. 6 illustrates a communication system 50 including the block ACK feature described herein. The exemplary embodiments described herein can be applied to any telecommunications system. Communication system 50 includes a terminal equipment (TE) device 52, an access point (AP) 54, a server 56, and a network 58. The TE device 52 can include memory (MEM), a central processing unit (CPU), a user interface (UI), and an input-output interface (I/O). The memory can include non-volatile memory for storing applications that control the CPU and random access memory for data processing. The I/O interface can include a network interface card of a wireless local area network, such as one of the cards based on the IEEE 802.11 standards.

The TE device 52 can be connected to the network 58 (e.g., a local area network (LAN), the Internet, a phone network) via the access point 54 and further to the server 56. The TE device 52 can also communicate directly with the server 56, for instance using a cable, infrared, or a data transmission at radio frequencies. The server 56 can provide various processing functions for the TE device 52.

The TE device 52 can be any portable electronic device, in which speech recognition is performed, for example a personal digital assistant (PDA) device, remote controller or a combination of an earpiece and a microphone. The TE device 52 can be a supplementary device used by a computer or a mobile station, in which case the data transmission to the server 56 can be arranged via a computer or a mobile station. In an exemplary embodiment, the TE device 52 is a mobile station communicating with a public land mobile network, to which also the server 56 is functionally connected. The TE device 52 connected to the network 58 includes mobile station functionality for communicating with the network 58 wirelessly. The network 58 can be any known wireless network, for instance a network supporting the GSM service, a network supporting the GPRS (General Packet Radio Service), or a third generation mobile network, such the UMTS (Universal Mobile Telecommunications System) network according to the 3GPP (3$^{rd}$ Generation Partnership Project) standard. The functionality of the server 56 can also be implemented in the mobile network. The TE device 56 can be a mobile phone used for speaking only, or it can also contain PDA (Personal Digital Assistant) functionality.

While several embodiments of the invention have been described, it is to be understood that modifications and changes will occur to those skilled in the art to which the invention pertains. The invention is not limited to a particular embodiment, but extends to various modifications, combinations, and permutations that nevertheless fall within the scope and spirit of the appended claims.

The invention claimed is:

1. A method comprising:
providing, in a communication frame, an aggregated block acknowledgement structure, the aggregated block acknowledgement structure comprising a plurality of block acknowledgements, wherein each block acknowledgement of the plurality of block acknowledgements comprises a start sequence number and a block acknowledgement bitmap, and wherein each block acknowledgement corresponds to one traffic identifier of a number of traffic identifiers;
providing, in the communication frame, a data field including a value indicating the number of traffic identifiers; and
causing transmission of the communication frame.

2. The method of claim 1, further comprising communicating a single acknowledgement in response to multiple frames sent in aggregated fashion to a communication station.

3. The method of claim 1, further comprising causing transmission of quality of service data.

4. The method of claim 1, wherein the communication frame includes an identification for a receiver.

5. The method of claim 1, wherein the communication frame includes a block acknowledgement control field.

6. The method of claim 1, wherein the communication frame includes a duration field indicating a length for the communication frame.

7. The method of claim 1, further comprising communicating the communication frame at the end of a communication burst.

8. The method of claim 1, further comprising communicating the communication frame after a delay from the end of a communication burst.

9. The method of claim 1, further comprising transmitting the communication frame at a lower data rate than a data rate of communicated data from a station.

10. A system comprising:
an input/output interface; and
memory storing executable instructions that, when executed by a processor, control the processor to at least:
generate an aggregated block acknowledgement structure comprising a plurality of block acknowledgements, wherein each block acknowledgement of the plurality of block acknowledgements comprises a start sequence number and a block acknowledgement bitmap, wherein each block acknowledgement corresponds to one traffic identifier of a number of traffic identifiers, and wherein the aggregated block acknowledgement structure includes a data field indicating the number of traffic identifiers; and
cause transmission of the block acknowledgement structure using the input/output interface.

11. The system of claim 10, wherein the aggregated block acknowledgement structure includes a block acknowledgement control field.

12. The system of claim 10, wherein the aggregated block acknowledgement structure includes a duration field indicating a length for a communication frame.

13. The system of claim 10, wherein data communicated by the system comprises quality of service data.

14. A device comprising:
a processor; and
memory storing executable instructions that, when executed by the processor, control the device to at least:

generate an aggregated block acknowledgement structure that includes a plurality of block acknowledgements, wherein each block acknowledgement of the plurality of block acknowledgements comprises a start sequence number and a block acknowledgement bitmap, wherein each block acknowledgement corresponds to one traffic identifier of a number of traffic identifiers, and wherein the aggregated block acknowledgement structure includes a data field indicating the number of traffic identifiers.

15. The device of claim 14, wherein the aggregated block acknowledgement structure includes a block acknowledgement control field.

16. The device of claim 14, wherein the aggregated block acknowledgement structure includes a duration field indicating a length for a communication frame.

17. The device of claim 14, wherein the memory further stores executable instructions that, when executed by the processor, control the device to: communicate quality of service data.

18. A non-transitory computer-readable medium storing executable instructions that, when executed, control a processor to at least:

generate an aggregated block acknowledgement structure comprising a plurality of block acknowledgements, wherein each block acknowledgement of the plurality of block acknowledgements comprises a start sequence number and a block acknowledgement bitmap, wherein each block acknowledgement corresponds to one traffic identifier of a number of traffic identifiers, and wherein the aggregated block acknowledgement structure includes a data field indicating the number of traffic identifiers.

19. The non-transitory computer readable medium of claim 18, further storing executable instructions that, when executed, control the processor to determine an end to a transmit opportunity.

* * * * *